United States Patent [19]

Rukavina et al.

[11] Patent Number: 4,725,501
[45] Date of Patent: Feb. 16, 1988

[54] PRIMER FOR ADHERENCE TO PLASTIC SUBSTRATES

[75] Inventors: Thomas G. Rukavina, Lower Burrell; Chia-Cheng Lin, Gibsonia, both of Pa.

[73] Assignee: PPG Industries, Inc., Pittsburgh, Pa.

[21] Appl. No.: 737,859

[22] Filed: May 28, 1985

[51] Int. Cl.$^4$ .................... B32B 27/36; B05D 1/18; C07F 7/28

[52] U.S. Cl. ................................ 428/412; 428/448; 428/518; 428/520; 428/701; 428/702; 106/287.16; 106/287.19; 427/164; 427/380; 427/397.7

[58] Field of Search ............... 428/412, 448, 518, 520, 428/701, 702; 427/380, 110, 164

[56] References Cited

U.S. PATENT DOCUMENTS

| | | | |
|---|---|---|---|
| 4,103,045 | 7/1978 | Lesaicherre et al. | 428/702 X |
| 4,166,876 | 9/1979 | Chiba et al. | 428/702 X |
| 4,272,588 | 6/1981 | Yoldas et al. | 428/433 |
| 4,278,632 | 7/1981 | Yoldas | 264/66 |
| 4,346,131 | 8/1982 | Yoldas | 428/35 |
| 4,361,598 | 11/1982 | Yoldas | 427/74 |
| 4,513,061 | 4/1985 | Kawakubo et al. | 428/448 X |

*Primary Examiner*—P. C. Ives
*Attorney, Agent, or Firm*—Donna L. Seidel

[57] ABSTRACT

A silicate/titanate copolymer is disclosed for use as a primer in adhering rigid polymer substrates to elastomeric interlayers or inorganic coatings.

5 Claims, No Drawings

PRIMER FOR ADHERENCE TO PLASTIC SUBSTRATES

The present invention relates generally to the art of adherence to plastics, and more particularly to the art of primers which increase the adherence of various coatings to plastic substrates.

Various organic adhesives are known in the art to bond coatings to plastic substrates.

The present invention provides an inorganic polymer which is very effective to promote adhesion of coatings to plastic substrates. The inorganic polymer primer of the present invention is useful in promoting adhesion of a film such as an elastomeric interlayer e.g. a vinyl interlayer to such surfaces as stretched acrylic or a metal oxide coated stretched acrylic substrate. The inorganic polymer of the present inventions is also useful in providing adhesion of inorganic coatings such as siloxanes to plastic surfaces.

The inorganic polymer primer of the present invention comprises both silicate and titanate. A silicate/titanate primer in accordance with the present invention may be formulated simply by dissolving or partially hydrolyzing appropriate silicate and titanate compounds, preferably silicon and titanium alkoxides, in a suitable solvent. Organic solvents such as alcohols are preferred, particularly isopropanol which contains up to about 0.2 percent water.

A preferred primer in accordance with the present invention comprises tetraethylorthosilicate and titanium butoxide dissolved in 2-propanol. An equimolar mixture of tetraethylorthosilicate and titanium butoxide dissolved in 2-propanol at a concentration of about one half to one percent is a particularly preferred primer.

A solution of silicate/titanate primer in accordance with the present invention may be applied to a substrate surface by any convenient means such as dipping or spraying. Flow coating is a preferred method of application. The primer of the present invention may be applied at ambient temperature. The solvent may be evaporated at ambient temperature, or evaporation may be accelerated by heating. However, heat curing of the silicate/titanate primer of the present invention is not necessary.

While a silicate/titanate primer in accordance with the present invention may be obtained by simply mixing a silicate compound and a titanate compound together in an appropriate solvent, such a primer may be most effective only under conditions of low relative humidity, i.e. less than 50 percent, because of the moisture sensitivity of unhydrolyzed or unreacted titanate. At high relative humidity, adhesion promotion of the silicate/titanate primer may be compromised.

In a particularly preferred embodiment of the present invention, a silicate/titanate primer is prepared in such a manner as to substantially reduce its moisture sensitivity. First, a silicate compound, preferably tetraethylorthosilicate, is partially hydrolyzed. The hydrolysis of tetraethylorthosilicate is preferably carried out in acidified alcohol, preferably 2-propanol containing an excess amount of water per mole of silicate, preferably a ratio of from 2 to 8 water per silicate. The hydrolyzing solution is preferably heated for about one hour at a temperature of about 50° to 80° C. A titanate compound, preferably titanium (IV) butoxide is then added and mixed into the hydrolysate. The molar ratio of silicate to titanate is preferably about equimolar. The resulting silicate/titanate primer is water insensitive and may be applied and used in high humidity environments.

The present invention will be further understood from the description of the specific examples which follow.

EXAMPLE I

A stretched acrylic substrate is sprayed with a primer solution comprising 0.5 percent by weight of a mixture of equimolar amounts of tetraethylorthosilicate and titanium (IV) butoxide in isopropanol containing 0.2 percent water. The solvent is evaporated to yield a film of silicate/titanate copolymer. To the primed acrylic surface is laminated an interlayer of 0.060 inch (1.5 millimeter) thick vinyl containing 37.5 parts dibutyl sebacate plasticizer. The lamination is accomplished at 210° F. (about 99° C.) using pressure of 25 pounds per square inch for 90 minutes. The average peel strength of the resulting laminate is about 40 pounds per lineal inch.

EXAMPLE II

An acrylic substrate is laminated to a vinyl interlayer as in the previous example. The acrylic surface is primed with silicate/titanate primer as in the previous example except that the primer solution contains 1.0 percent of the silicate/titanate primer, and is flow coated rather than sprayed onto the acrylic surface. The average peel strength is about 55 to 60 pounds per lineal inch (pli).

EXAMPLE III

A stretched acrylic substrate is coated with a conductive indium/tin oxide coating by magnetron sputtering. The indium/tin oxide conductive coating is deleted from an area about the periphery of the coated surface, and bus bars are applied. A silicate/titanate primer in accordance with the present invention is prepared by dissolving 0.49 parts by weight of tetraethylorthosilicate in 98.7 parts isopropanol which contains at least about 0.04 percent water. The solution is heated to a temperature of about 60° to 70° C. To the solution is added 0.033 parts by weight additional water and 2 drops of hydrochloric acid per 100 grams of total weight. After heating at 60° to 70° C. for about one hour to hydrolyze the silicate, 0.76 parts by weight titanium (IV) butoxide is added. Heating at 60° to 70° C. is continued for an additional 30 minutes. The resulting silicate/titanate primer solution is diluted with an equal volume of n-butanol resulting in a final concentration of about 0.5 percent silicate/titanate solids. The primer solution is sprayed over the entire surface, coated and coating deleted, of the acrylic substrate. The silicate/titanate primer polymerizes as the solvent evaporates to form a transparent primer film. A second stretched acrylic substrate is similarly coated with the silicate/titanate primer solution of the present invention, and the solvent is evaporated to yield a transparent primer film. The two primed acrylic surfaces are then laminated together with a sheet of 0.060 inch (1.5 millimeter) thick vinyl interlayer containing 37.5 parts DBS (dibutyl sebacate) plasticizer at 210° F. (about 99° C.) at 25 pounds per square inch for 90 minutes. The average peel strength is 90 to 115 pounds per lineal inch (pli).

EXAMPLE IV

An indium/tin oxide coated acrylic substrate is laminated to another acrylic substrate with a vinyl interlayer as in Example III. The indium/tin oxide coated acrylic surface and the uncoated acrylic surface to be laminated are both primed with the silicate/titanate primer of Example III except that the primer is flow coated rather than sprayed. The average peel strength is 115 to 165 pounds per lineal inch.

The above examples are offered only to illustrate the present invention. Various other silicate and titanate compounds such as tetramethylorthosilicate and titanium isopropoxide may be hydrolyzed and reacted in various concentrations and solvents to form silicate/titanate primers in accordance with the present invention. The primers of the present invention may be used in adhering a variety of materials in addition to acrylic substrates, vinyl interlayers and metal oxide films, such as polycarbonates, polysilicates and polysiloxanes. The scope of the present invention is defined by the following claims.

We claim:
1. A laminated product comprising:
   a. a rigid polymeric substrate;
   b. an elastomeric interlayer adhered to said substrate; and
   c. between said polymeric substrate and said elastomeric interlayer, a primer comprising a silicate/titanate inorganic copolymer.
2. A laminated product according to claim 1, wherein said rigid polymeric substrate is selected from the group consisting of polyacrylates and polycarbonates.
3. A laminated product according to claim 1, wherein said interlayer is a vinyl polymer.
4. A laminated product according to claim 1, wherein said primer is a reaction product of tetraethylorthosilicate and titanium (IV) butoxide.
5. A coated product comprising:
   a. a rigid organic polymeric substrate;
   b. an inorganic coating on said substrate; and
   c. between said substrate and said coating a primer comprising a silicate/titanate copolymer.

* * * * *